(12) United States Patent
Parry

(10) Patent No.: US 7,274,473 B2
(45) Date of Patent: Sep. 25, 2007

(54) DEVICE ERROR ARCHIVE

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 931 days.

(21) Appl. No.: 09/991,804

(22) Filed: Nov. 19, 2001

(65) Prior Publication Data

US 2003/0097619 A1    May 22, 2003

(51) Int. Cl.
*G06K 15/00*    (2006.01)
(52) U.S. Cl. ............... 358/1.14; 358/405; 358/437
(58) Field of Classification Search ............... 358/1.14, 358/437, 1.1, 1.15, 1.16, 400, 401, 402, 405, 358/434
See application file for complete search history.

(56) References Cited

U.S. PATENT DOCUMENTS 5,845,057 A * 12/1998 Takeda et al. ............. 358/1.15
5,956,487 A * 9/1999 Venkatraman et al. ...... 709/218
6,078,400 A * 6/2000 Mizutani .................... 358/1.14
6,108,099 A * 8/2000 Ohtani ....................... 358/1.15

FOREIGN PATENT DOCUMENTS

JP    0531887 A * 12/1993

\* cited by examiner

*Primary Examiner*—Thomas D. Lee

(57) ABSTRACT

A method of error archiving for an imaging device is provided. The method includes monitoring system operations for the imaging device, and when an error is detected, compiling information about the error into an error file for one or more of storage, transmission, retrieval, and disposal. In addition, an imaging device including error archiving is provided. The imaging device includes a processor adapted to compile error information when an error is detected, a storage device coupled to the processor and adapted to store the error information for one or more of transmission, retrieval, and disposal of the error information based on user criteria, and a print engine coupled to the processor and adapted to produce tangible output images.

20 Claims, 2 Drawing Sheets

DEVICE ERROR ARCHIVE

TECHNICAL FIELD

The present invention relates generally to the field of electronic devices and, in particular, to the notification and recordation of errors.

BACKGROUND

A wide variety of devices including office equipment, home-based equipment, and lab equipment, as well as a variety of other types of devices commonly encounter errors. Office equipment includes but is not limited to printers, scanners, facsimile machines, copiers, and various types of communication and telephony devices. Home-based devices include, for example, home entertainment equipment such as televisions, video, and audio players and recorders, receivers, as well as security systems, automobiles, appliances, thermostats, exercise equipment, medical equipment, saunas, pools, and hot tubs. Lab equipment includes, for example, measurement devices such as oscilloscopes and spectrum analyzers, testing equipment, and network devices.

With the introduction of digital circuitry, often a LED or LCD associated with a device displays an error message when an error is detected. Currently error messages contain minimal information such as "error" and in some instances a number or code associated with the error is provided. The events leading up to and the reason for the error are frequently unknown. Often, when a service technician is contacted, the only information available to the technician is that an error occurred, possibly an error number, and a description of what led up to the error by the user or in some cases another person who is asked to relay what occurred. Without additional information, the service technician is not able to diagnose the reason for the error. In many instances, without additional information the device is simply shut down or reinitiated without solving the problem causing or leading to the error(s). Significant time and money can be spent on unknown service errors for example, through the loss of information, in some instances the retransmission of information, the loss of product, personnel time spent correcting the error, resetting the device, and determining what the effect of the error was. This is particularly true in workplaces employing imaging devices such as printers, copiers, facsimile machines, scanners, plotters, digital projectors, terminals and the like.

For the reasons stated above, and for other reasons stated below which will become apparent to those skilled in the art upon reading and understanding the present specification, there is a need in the art for improvements in error recordation and notification for devices.

SUMMARY

The above-mentioned problems with the diagnosis of device errors and other problems are addressed by embodiments of the present invention and will be understood by reading and studying the following specification.

In one embodiment, an imaging device is provided. The imaging device includes a processor adapted to compile error information when an error is detected, a storage device coupled to the processor and adapted to store the error information for one or more of transmission, retrieval, and disposal of the error information based on user criteria, and a print engine coupled to the processor and adapted to produce tangible output images.

In another embodiment, a method of error archiving for an imaging device is provided. The method includes monitoring system operations for the imaging device, and when an error is detected, compiling information about the error into an error file for one or more of storage, transmission, retrieval, and disposal.

In another embodiment, a computer-usable medium having computer readable instructions stored thereon for execution by a processor to perform a method of error archiving for a device is provided. The method includes monitoring system operations of the device, and when an error is detected, compiling information about the error into an error file for one or more of storage, transmission, retrieval, and disposal.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide error archiving for a wide variety of devices including office equipment, home-based equipment, and lab equipment, as well as a variety of other types of devices. In one embodiment, error archiving includes error notification and recordation. In another embodiment, error archiving includes error notification, recordation, and diagnosis. The archiving of error information enables a user, system administrator, service technician, or the like to "step back in time" and view what led up to the error.

Figure 1:
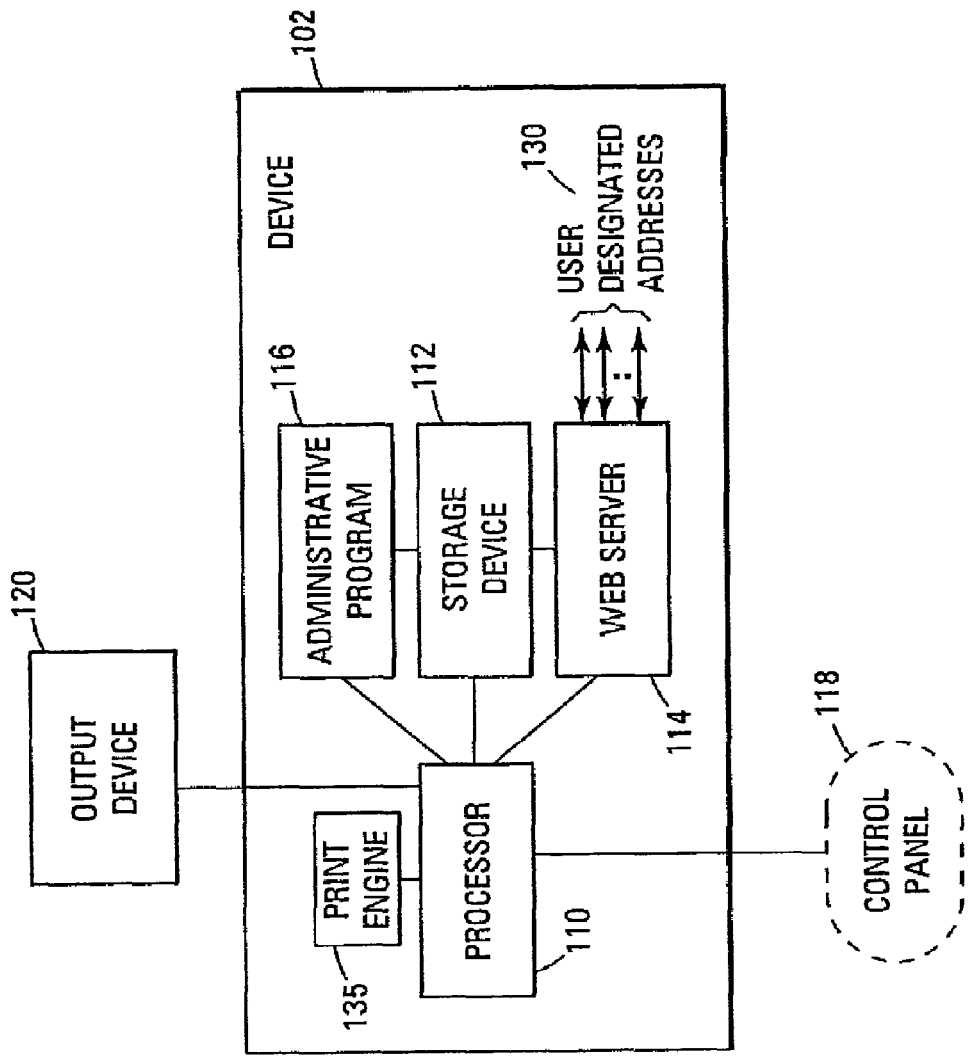
FIG. 1 is a block diagram of an embodiment of a device including an error recordation and notification system according to the teachings of this invention.

FIG. 1 is a block diagram of an embodiment of a device, indicated generally at 102, adapted to perform error archiving according to the teachings of the present invention. Device 102 includes a processor 110 and a storage device 112 coupled to processor 110. In one embodiment, device 102 further includes an embedded web server 114 for communication between device 102 and user-designated addresses 130. In another embodiment, device 102 further includes an administrative program 116 for device management.

In operation, processor 110 monitors system operations of device 102 for an indication that an error has occurred within device 102. In another embodiment, processor 110 receives an indication that an error has occurred within device 102, such as a notification, an error signal, or the like. Errors include service errors, system operation errors, lack of memory, cancellation of one or more operations, and the like. When an error is detected, processor 110 compiles information about the error into an error file. Information about the detected error includes one or more of the location where the error occurred (e.g. program address where the error occurred), the type of error detected, contents of the file being processed when the error occurred, sequence of events that led up to the error, type of file or operation being processed when the error occurred, size of the file or operation being processed when the error occurred, a stack trace, and the like.

Once the error information is compiled it is available for storage, transmission, retrieval, disposal or the like. In one embodiment, the error information is stored in storage device 112 for subsequent transmission, retrieval, disposal, or the like. Storage device 112 comprises a computer-usable media such as a static random access memory (SRAM), dynamic random access memory (DRAM), a non-volatile memory device, a register, magnetic media, optical media, or the like. In one embodiment, the error information is available for access via web server 114. In another embodiment, the error information is transmitted via web server 114 to one or more user-designated addresses such as the device manufacturer, the service contract administrator, a system administrator, an alternate storage location, or the like. In one embodiment, the user-designated addresses are web addresses, email address, http addresses, or the like. In one embodiment, processor 110 communicates with the user-designated addresses via web server 114. In another embodiment, the error information compiled by processor 110 is posted to one or more user-designated addresses for example the manufacturer web site. In another embodiment, the error information is provided to administrative program 116 for further manipulation, storage, reporting, or the like. An example of an administrative program is disclosed in U.S. Pat. No. 5,956,487, entitled Embedding Web Access Mechanism in an Appliance for User Interface Functions Including a Web Server and Web Browser.

In one embodiment, device 102 includes a control panel 118 that is internal or external to device 102. In one embodiment, control panel 118 includes a display. In one embodiment, error information is accessed via control panel 118. In another embodiment, error information is accessed via web server 114. In one embodiment, error information is separated into one or more types of error information. For example, in one embodiment, error information comprises user error information and administrator error information. In one embodiment, the user error information is displayed via control panel 118 and includes the indication of an error and error identification such as a number, abbreviation, or the like. In one embodiment, the administrator error information comprises one or more of the location where the error occurred, the type of error detected, contents of the file being processed when the error occurred, sequence of events that led up to the error, type of file or operation being processed when the error occurred, size of the file or operation being processed when the error occurred, and a stack trace, and the like. In one embodiment, the contents of the file being processed when the error occurred are an option that is set by the user or administrator.

In one embodiment, processor 110 transmits error information to one or more user-designated addresses via web server 114. In another embodiment, processor 110 communicates the detection of an error to one or more user-designated addresses. In one embodiment, the notification of error detection by processor 110 enables one or more of the user-designated addresses to access the error information via web server 114. In one embodiment, a user or administrator can set what error information is available for access (e.g. a user or administrator may opt to not allow contents of the file being processed when the error occurred to be accessed). In another embodiment, the error information is stored in storage device 112 for later retrieval or transmission. In one embodiment, processor 110 transmits the error information to an output device 120 for display, storage, printing, further manipulation, or the like.

In one embodiment, once storage device 112 is full, a notification message is transmitted to one or more of the user-designated sites. In another embodiment, as the storage device becomes full, new error information is stored and old error information is deleted. In an alternate embodiment, a user determined number of error information files is stored. In one embodiment, once the error information is transmitted to the user-designated addresses, the error information is deleted.

In one embodiment, device 102 is an imaging device and includes a print engine 135 coupled to processor 110. Print engine 135 represents the mechanical aspects of an imaging device. Print engine 135 produces tangible output images at output device 120. Error information for an imaging device contains information such as, the page number of the error, the type of error, the type of file or document being processed when the error occurred (e.g. a Post Script file, a text file, an image file or the like), error codes, and stack trace. In one embodiment, error archiving allows a user/service technician to access information about recent errors on imaging device platforms. The error information enables the user/service technician to easily identify what is causing the error. In one embodiment, error archiving allows diagnosis of a particular imaging environment, such as printing, scanning, faxing, copying, plotting, projecting and the like. In one embodiment, processor 110 transmits the error information to print engine 135 for printing or transmits the error information to an output device 120 for display, storage, printing, further manipulation, or the like.

Figure 2:
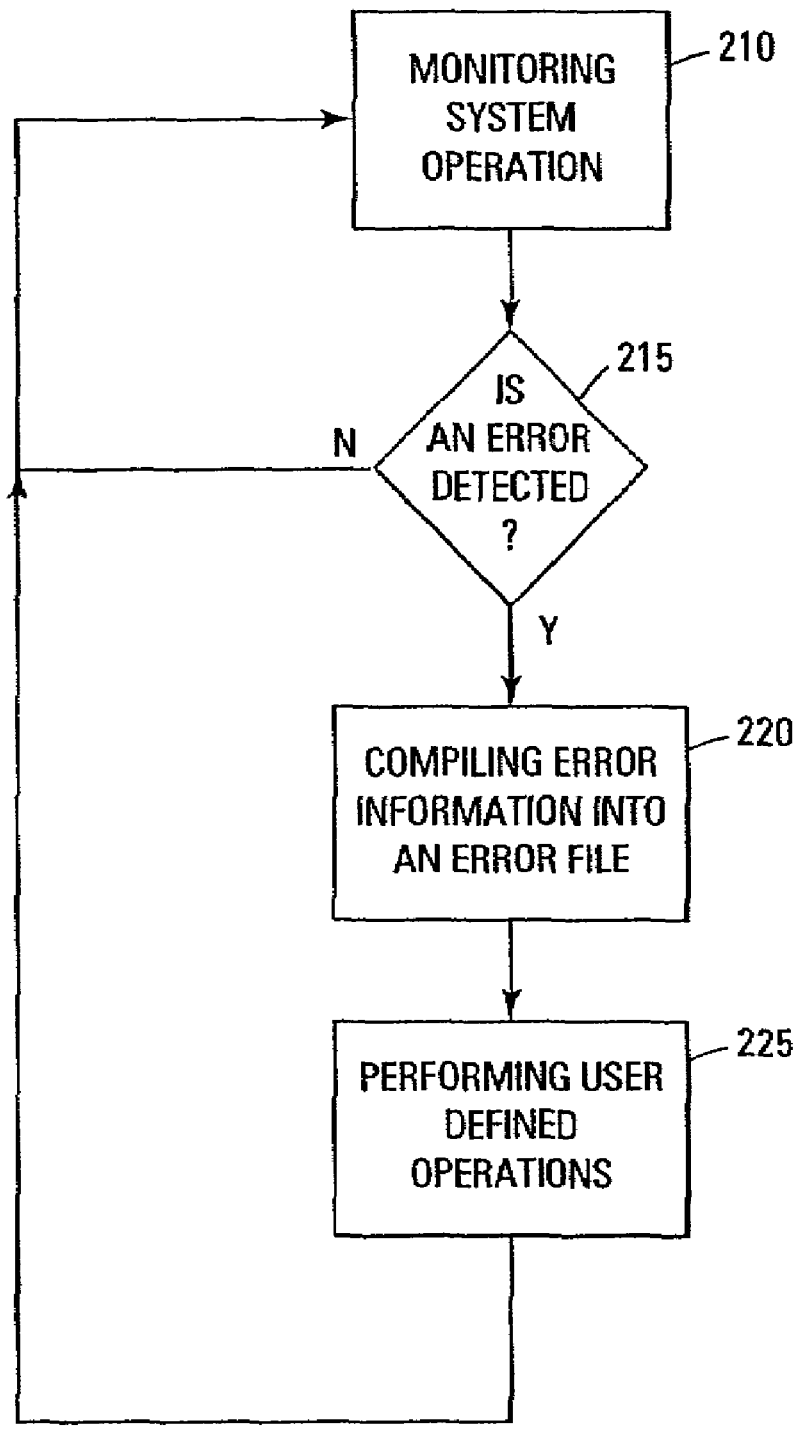
FIG. 2 is flow chart of a method of error archiving for a device according to one embodiment of this invention.

FIG. 2 is a flowchart of a method of error archiving for a device according to one embodiment of this invention. In one embodiment, the device is an imaging device. The method begins at block 210 and monitors system operations for a device. The method proceeds to block 215 and determines if an error is detected. When an error is not detected, the method returns to block 210 and continues to monitor system operations. When an error is detected the method proceeds to block 220 and information about the error is compiled into an error file. The method proceeds to block 225 and performs one or more user-defined operations. In one embodiment, user-defined operations include one or more of storing the error file in a storage device, transmitting the error information to one or more user designated addresses, providing the error information for retrieval by an external device, transmitting the error information to an output device, disposing of the error information, determining correction procedures based on the error information, and the like.

In one embodiment, transmitting error information to one or more user-designated addresses includes transmitting error detection notification to one or more user-designated addresses and providing the error information for retrieval by an external device. In one embodiment, the output device includes an imaging device, display, storage device, an administrative program, or the like.

CONCLUSION

Methods of error archiving and devices employing error archiving have been detailed. In one embodiment, a method of error archiving in an imaging device has been described. The method includes monitoring system operations for the imaging device and when an error is detected, compiling information about the error into an error file for one or more of storage, transmission, retrieval, and disposal.

In another embodiment, an imaging device is described. The imaging device includes a processor adapted to compile error information when an error is detected, a storage device coupled to the processor and adapted to store the error information for one or more of transmission, retrieval, and disposal of the error information based on user criteria, and a print engine coupled to the processor and adapted to produce tangible output images.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is intended that this invention be limited only by the claims and the equivalents thereof.

What is claimed is:

1. An imaging device, comprising:
    a processor adapted to compile error information when an error is detected, wherein the error is based on one or more imaging device processes;
    a print engine coupled to the processor and adapted to produce tangible output images; and
    a storage device coupled to the processor, wherein the storage device is a computer-usable medium and where the processer is adapted to store in the storage device the error information for two or more errors for one or more of transmission, retrieval, and disposal of the error information based on user criteria;
    wherein the error information stored by the processor in the storage device is selectable from two or more of a location where the error occured, a type of error detected, a program address where the error occured, contents of the file being processed when the error occured, sequence of events that led up to the error, type of file being processed when the error occured, size of the file being processed when the error occured, a page number, an error code, and a stack trace.

2. The imaging device of claim 1, wherein the error information comprises user error information and administrator error information.

3. The imaging device of claim 2 wherein the processor is adapted to transmit the administrator error information to one or more user designated addresses, where the one or more user designated address are selected from one or more e-mail addresses, web addresses, printer addresses, facsimile addresses, and http addresses.

4. The imaging device of claim 2, wherein the user error information comprises the location where the error occurred and the type of error detected, and where the administrator error information includes the location where the error occured, the type of error detected, and one or more of the program address where the error occured, contents of the file being processed when the error occurred, sequence of events that led up to the error, type of file being processed when the error occurred, size of the file being processed when the error occurred, a page number, an error code, and a stack trace.

5. The imaging device of claim 1, further comprising a control panel coupled to the processor and adapted to enable access of the error information.

6. The imaging device of claim 1, further comprising an embedded web server coupled to processor, wherein the embedded web server is adapted to interface between the processor and one or more user-identified addresses.

7. The imaging device of claim 1, wherein the computer-usable medium of the storage device comprises one or more of an SRAM, DRAM, non-volatile memory, register, magnetic media, and optical media.

8. A method of error archiving for an imaging device, comprising:
    monitoring system operations for the imaging device; and
    when an error is detected, compiling information about the error into an error file stored on a storage device of the imaging device for one or more of storage, transmission, retrieval, and disposal;
    wherein the storage device is a computer-usable medium;
    wherein the information about two or more errors is stored in the error file; and
    wherein the information about each error stored on the storage device is configurable and includes two or more of a location where the error occured, a type of error detected, a program address where the error occured, contents of the file being processed when the error occured, sequence of events that led up to the error, type of file being processed when the error occured, size of the file being processed when the error occured, and a stack trace.

9. The method of claim 8, wherein compiling information about an error into an error file further comprises:
    displaying user error information, wherein the user information is selected from one or more of the location where the error occured and the type of error detected; and
    storing administrator error information, wherein the administrator information is selected from two or more of the location where the error occured, the type of error detected, and one or more of the program address where the error occured, contents of the file being processed when the error occured, sequence of events that led up to error, type of file being processed when the error occured, size of the file being processed when the error occured, a page number, an error code, and a stack trace.

10. The method of claim 8, wherein the computer-usable medium of the storage device comprises one or more of an SRAM, DRAM, non-volatile memory, register, magnetic media, and optical media.

11. The method of claim 8, further comprising:
    transmitting administrator error information to one or more user designated addresses, wherein the one or more user designated address comprise one or more e-mail addresses, web addresses, printer addresses, facsimile addresses, and http addresses; and
    wherein the administrator error information includes the location where the error occurred, the type of error detected, and one or more of the program address where the error occurred, contents of the file being processed when the error occurred, sequence of events that led up to the error, type of file being processed when the error occurred, size of the file being processed when the error occurred, and a stack trace.

12. The method of claim 8, wherein detecting an error further comprises detecting one of a service error, a system operation error, a lack of memory, and an operation cancellation.

13. The method of claim 8, further comprising, diagnosing the error from the error information and determining correction procedures based on the detected error.

14. The method of claim 8, further comprising selectively transmitting error information from the error file to one of an associated imaging device administration program, a web server, a http address, a web address, and an email address.

15. A computer-readable medium having computer readable instructions stored thereon for execution by a processor to perform a method of error archiving for an imaging device comprising:

monitoring system operations of the imaging device; and when an error is detected, compiling information about the error into an error file and storing it on a storage for one or more of storage, transmission, retrieval, and disposal;

wherein the storage device is a computer-usable medium associated with the imaging device;

wherein the information for two or more errors is stored in the error file; and wherein the information about each error stored by the processor on the storage device is selected and includes two or more of a location where the error occured, a type of error detected, a program address where the error occured, contents of the file being processed when the error occured, sequence of events that led up to the error, type of file being processed when the error occured, size of the file being processed when the error occured, a page number, an error code, and a stack trace.

16. The computer-readable medium of claim 15, wherein the method further comprises:

displaying user error information, wherein the user information includes one or more of the page number where the error occured and the type of service error detected; and storing administrator error information, wherein the administrator information includes two or more of the location where the error occured, the type of error detected, and one or more of the program address where the error occured, contents of the file being processed when the error occured, sequence of events that led up to the error, type of file being processed when the error occured, size of the file being processed when the error occured, a page number, an error code, and a stack trace.

17. The computer-readable medium of claim 15, wherein the method further comprises:

outputting selected elements of the compiled error information by one of printing selected elements of the compiled error information, transmission of selected elements of the compiled error information to a user designated address, displaying selected elements of the compiled error information on a control panel, and displaying selected elements of the compiled error information through an embedded web server.

18. The computer-readable medium of claim 15, wherein the method further comprises:

sending administrator error information to one of an imaging device administrator program, the imaging device manufacturer, a service contract administrator, a system administrator, and an alternate storage location.

19. The computer-readable medium of claim 15, further comprising:

when the storage device is full, selecting an action from one or more of deleting the oldest error information and storing the new error information, sending a notification to one or more user designated addresses, and deleting error information once transmitted from the imaging device.

20. The computer-readable medium of claim 15, wherein the method further comprises:

performing error correction procedures based on the detected error.

* * * * *

UNITED STATES PATENT AND TRADEMARK OFFICE
CERTIFICATE OF CORRECTION

PATENT NO.         : 7,274,473 B2
APPLICATION NO.    : 09/991804
DATED              : September 25, 2007
INVENTOR(S)        : Travis J. Parry It is certified that error appears in the above-identified patent and that said Letters Patent is hereby corrected as shown below:

On the Title Page, Item (56), under "Foreign Patent Documents", line 1, delete "0531887" and insert -- 05318887 --, therefor.

In column 5, line 28, in Claim 1, delete "processer" and insert -- processor --, therefor.

In column 5, line 34, in Claim 1, delete "occured" and insert -- occurred --, therefor.

In column 5, line 35, in Claim 1, delete "occured" and insert -- occurred --, therefor.

In column 5, line 37, in Claim 1, delete "occured" and insert -- occurred --, therefor.

In column 5, line 38, in Claim 1, delete "occured" and insert -- occurred --, therefor.

In column 5, line 39, in Claim 1, delete "occured" and insert -- occurred --, therefor.

In column 5, line 52, in Claim 4, after "detected" delete ",".

In column 5, line 54, in Claim 4, delete "occured" and insert -- occurred --, therefor.

In column 5, line 55, in Claim 4, delete "occured" and insert -- occurred --, therefor.

In column 6, line 17, in Claim 8, delete "occured" and insert -- occurred --, therefor.

In column 6, line 18, in Claim 8, delete "occured" and insert -- occurred --, therefor.

In column 6, line 20, in Claim 8, delete "occured" and insert -- occurred --, therefor.

In column 6, line 21, in Claim 8, delete "occured" and insert -- occurred --, therefor.

In column 6, line 22, in Claim 8, delete "occured" and insert -- occurred --, therefor.

In column 6, line 28, in Claim 9, delete "occured" and insert -- occurred --, therefor.

In column 6, line 32, in Claim 9, delete "occured" and insert -- occurred --, therefor.

UNITED STATES PATENT AND TRADEMARK OFFICE
CERTIFICATE OF CORRECTION

PATENT NO.         : 7,274,473 B2
APPLICATION NO.    : 09/991804
DATED              : September 25, 2007
INVENTOR(S)        : Travis J. Parry It is certified that error appears in the above-identified patent and that said Letters Patent is hereby corrected as shown below:

In column 6, line 34, in Claim 9, delete "occured" and insert -- occurred --, therefor.

In column 6, line 35, in Claim 9, delete "occured" and insert -- occurred --, therefor.

In column 6, line 36, in Claim 9, after "up to" insert -- the --.

In column 6, line 37, in Claim 9, delete "occured" and insert -- occurred --, therefor.

In column 6, line 38, in Claim 9, delete "occured" and insert -- occurred --, therefor.

In column 7, line 9, in Claim 15, after "storage" insert -- device --.

In column 7, line 17, in Claim 15, delete "selected" and insert -- selectable --, therefor.

In column 7, line 18, in Claim 15, delete "occured" and insert -- occurred --, therefor.

In column 7, line 20, in Claim 15, delete "occured" and insert --occurred --, therefor.

In column 7, line 21, in Claim 15, delete "occured" and insert -- occurred --, therefor.

In column 7, line 23, in Claim 15, delete "occured" and insert -- occurred --, therefor.

In column 7, line 24, in Claim 15, delete "occured" and insert -- occurred --, therefor.

In column 7, line 30, in Claim 16, delete "occured" and insert -- occurred --, therefor.

In column 7, line 34, in Claim 16, delete "occured" and insert -- occurred --, therefor.

In column 7, line 36, in Claim 16, delete "occured" and insert -- occurred --, therefor.

In column 8, line 1, in Claim 16, delete "occured" and insert -- occurred --, therefor.

UNITED STATES PATENT AND TRADEMARK OFFICE
CERTIFICATE OF CORRECTION

PATENT NO. : 7,274,473 B2  
APPLICATION NO. : 09/991804  
DATED : September 25, 2007  
INVENTOR(S) : Travis J. Parry It is certified that error appears in the above-identified patent and that said Letters Patent is hereby corrected as shown below:

In column 8, line 3, in Claim 16, delete "occured" and insert -- occurred --, therefor.

In column 8, line 4, in Claim 16, delete "occured" and insert -- occurred --, therefor.

Signed and Sealed this

First Day of July, 2008

JON W. DUDAS  
*Director of the United States Patent and Trademark Office*